United States Patent
Eberling et al.

(10) Patent No.: US 6,488,343 B1
(45) Date of Patent: Dec. 3, 2002

(54) PARKING CONTROL CIRCUIT

(75) Inventors: Charles E. Eberling, Wellington, OH (US); David J. Knight, Avon Lake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 09/377,145

(22) Filed: Aug. 19, 1999

(51) Int. Cl.[7] .................................................. B60T 7/00
(52) U.S. Cl. .......................................... 303/15; 180/271
(58) Field of Search ............................. 303/3, 15, 20, 303/191; 180/271

(56) References Cited

U.S. PATENT DOCUMENTS

| | | | | |
|---|---|---|---|---|
| 3,838,748 A | * | 10/1974 | Gray et al. | 180/101 |
| 3,842,950 A | * | 10/1974 | Fontaine | 188/170 |
| 3,910,642 A | * | 10/1975 | Kimata et al. | 303/84 A |
| 4,339,154 A | * | 7/1982 | Duttarer et al. | 303/3 |
| 5,370,449 A | * | 12/1994 | Edelen et al. | 303/3 |
| 5,667,282 A | * | 9/1997 | Kim | 303/3 |
| 6,037,673 A | * | 3/2000 | Buhler et al. | 307/9.1 |

* cited by examiner

Primary Examiner—Jack Lavinder
Assistant Examiner—Xuan Lan Nguyen

(57) ABSTRACT

A parking brake control circuit engages the parking brake of a vehicle when the transmission of the vehicle is in the "park" position and the engine of the vehicle is turned off, without requiring the constant application of electrical power. The parking brake control circuit utilizes latching solenoid technology that eliminates the need for a constant voltage source. A time-delay relay is used to change the state of the latching solenoid. The time-delay relay is preferably activated through a circuit containing an engine oil pressure switch, a transmission park switch and a vehicle speed switch. Activation of the relay latches the solenoid in a position that allows the parking brake to be applied, without requiring the application of a constant voltage to the solenoid. Accordingly, the possibility of inadvertent brake application due to electrical failure is avoided.

11 Claims, 1 Drawing Sheet

PARKING CONTROL CIRCUIT

FIELD OF THE INVENTION

The invention relates in general to parking brake systems for vehicles. More specifically, the invention relates to a parking control circuit that automatically applies a parking brake of a vehicle when the transmission of the vehicle is in the "park" position and the engine of the vehicle is off.

BACKGROUND OF THE INVENTION

Vehicle regulations in some jurisdictions require the parking brake of a bus be automatically applied whenever the door of the bus is open or the transmission of the bus is in the "park" position and the engine of the bus is off. The application of the parking brake under these circumstances cannot be overridden except to allow for the servicing of the vehicle's brake system. The regulations are intended to prevent injury in the event that a malfunction occurs in the transmission that might cause the bus to move when parked.

Conventional systems that provide such a feature utilize in the application of a parking brake either require the application of electrical power to a solenoid when the vehicle's engine is running or the application of electrical power to a solenoid when the vehicle's engine is off. The application of electrical power to an electrical solenoid when the engine is running can result in an inadvertent application of the vehicle's parking brake should the application of electrical power be interrupted. The application of electrical power to an electrical solenoid when the engine is off results in a drain on the vehicle's supply battery. The battery can become totally drained if the vehicle is parked for a long period of time, which can result in a release of the parking brake once the application of electrical power is interrupted to the solenoid.

In view of the above, it would be desirable to provide a parking brake control circuit that would engage the parking brake of a vehicle when the transmission of the vehicle is in the "park" position and the engine of the vehicle is turned off, but would not require the constant application of electrical power to an electrical control solenoid as in the case of conventional systems.

SUMMARY OF THE INVENTION

A parking brake control circuit is provided that engages the parking brake of a vehicle when the transmission of the vehicle is in the "park" position and the engine of the vehicle is turned off, without requiring the constant application of electrical power to an electrical control solenoid. The parking brake control circuit utilizes latching solenoid technology that eliminates the problems associated with conventional systems use of a constant voltage source. A time-delay relay is used to change the state of the latching solenoid. The time-delay relay is preferably activated through a circuit containing an engine oil pressure switch, a transmission park switch and a vehicle speed switch. Activation of the relay latches the latching solenoid in a position that allows the parking brake to be applied, without requiring the application of a constant voltage to the solenoid. Accordingly, the possibility of inadvertent brake application due to electrical failure is avoided.

More specifically, the parking brake control circuit incorporates an engine oil pressure switch including a first circuit input and a second circuit input, a transmission park switch including a first circuit input coupled to a first circuit output of the engine oil pressure switch and a second circuit input coupled to a second circuit output of the engine oil pressure switch, a first time delay relay having an input coupled to a second circuit output of the transmission park switch, a second time delay relay having an input coupled to a first circuit output of the transmission park switch, and a latching solenoid including a supply control input coupled to an output of the first time delay relay and an exhaust control input coupled to an output of the second time delay relay. The first circuit input of the engine oil pressure switch is coupled to an ignition circuit of the vehicle and the second circuit input of the engine oil pressure switch is coupled to a storage battery of the vehicle. A parking control valve is provided that includes a pilot control input, an air supply input and an air supply output. The air supply input of the parking control valve is coupled to an air supply of the vehicle and the air supply output of the parking control valve is coupled to a brake of the vehicle. The pilot control input of the parking control valve is coupled to a control port of the latching solenoid. In operation, the latching solenoid couples the pilot control port to the air supply of the vehicle when a signal is supplied to the supply control input, and couples the pilot control port to an exhaust port when a signal is supplied to the exhaust control input.

An override switch is also preferably provided to permit maintenance of the brakes. The override switch includes an input coupled to the ignition circuit of the vehicle and an output coupled to the input of the second time delay relay. Closing the override switch activates the second time delay relay to send a signal to the latching solenoid to couple the pilot control port to the exhaust port, thereby enabling the release of the parking brake.

Still further, in order to provide a greater measure of safety, a vehicle speed switch is provided that includes an input coupled to the second circuit output of the transmission park switch and an output coupled to the input of the first time delay relay. Accordingly, the first time delay relay is not activated unless the vehicle's speed is below a predetermined speed. Thus, the parking brake will not be activated while the vehicle is still moving at a speed greater than the predetermined speed, regardless of whether the engine has been turned off and the transmission has been placed in the "park" position.

Other features and advantages of the invention will become apparent to those of skill in the art after review of the following detailed description of the preferred embodiments of the invention and the accompanying drawings.

BRIEF DESCRIPTION OF THE DRAWINGS

The invention will be described with reference to certain preferred embodiments thereof as illustrated in the accompanying drawings, wherein.

DETAILED DESCRIPTION OF THE PREFERRED EMBODIMENTS

Figure 1:
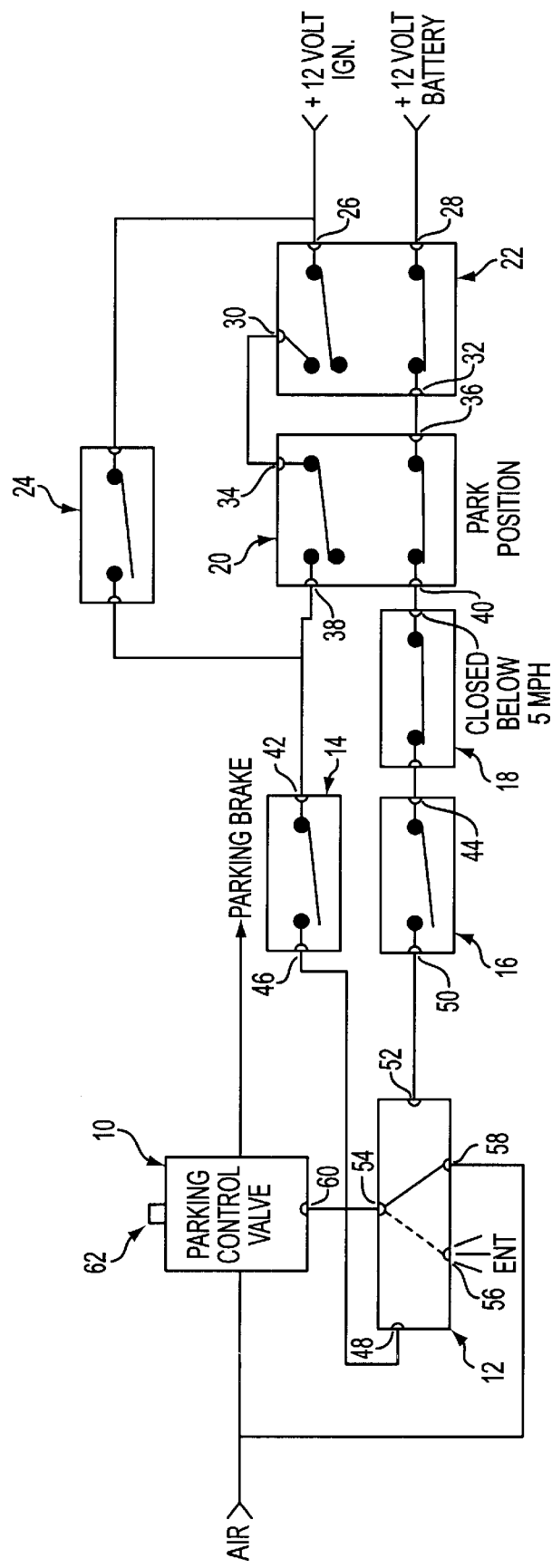
FIG. 1 is a schematic block diagram of a parking brake control circuit in accordance with the invention.

FIG. 1 is a schematic block diagram of a parking brake control circuit in accordance with the invention. The parking brake control circuit preferably includes a parking control valve 10 (for example PP-S parking control valve), a magnetic latching solenoid 12, time delay relays 14,16, a vehicle speed switch 18, a transmission park switch 20, an engine oil pressure switch 22, and a momentary contact override switch 24. The engine oil pressure switch 22 includes a first circuit input 26 that is coupled to the vehicle's +12 ignition circuit and a second circuit input 28 that is coupled to the vehicle's +12 volt storage battery. A first circuit output 30 and a second circuit output 32 of the engine oil pressure switch 22 are respectively coupled to a first circuit input 34 and a second circuit input 36 of the transmission park switch 20. A first circuit output 38 and a second circuit output 40 of the transmission park switch 20 are respectively coupled to an input of the first time delay relay 14 and an input of the vehicle speed switch 18. The output of the vehicle speed switch 18 is coupled to an input 44 of the second time delay relay 16. An output 46 of the first time delay relay 14 is coupled to an exhaust control input 48 of the latching solenoid 12. An output 50 of the second time delay relay 16 is coupled to a supply control input 52 of the latching solenoid 12.

The latching solenoid 12 includes a control port 54 that is selectively coupled to an exhaust port 56 and an air supply port 58 based on the latched state of the latching solenoid 12. An example of a suitable solenoid is the Skinner #71315SN1GNJ1M2G011 C1. The air supply port 58 is coupled to the vehicle's air supply reservoir, while the control port 54 is coupled to a pilot control port 60 of the parking control valve 10. Application of air to the pilot control port 60 causes the parking control valve 10 to trip to an exhaust position, thereby allowing for the application of a spring driven parking. The parking control valve 10 can also be activated manually by pulling the control knob 62 at any time.

In operation, a first circuit path is completed through the engine oil pressure switch 22 and the transmission park switch 20 to apply a voltage signal from the vehicle's ignition circuit to the first time delay rely 14. Application of the signal to the time delay relay 14 causes the relay to close for a predetermined time period, for example thirty seconds, which causes a signal to be applied to the exhaust control input 48 of the latching solenoid 12. The application of the signal to the exhaust control input 48 causes the latching solenoid 12 to latch in a position in which the control port 54 is coupled to the exhaust port 56. Accordingly, the pilot control input 60 of the parking control valve 10 is coupled to the exhaust port 56, thus the parking brake can be released by pushing the control knob 62 in a normal manner.

When the engine is turned off and the transmission is placed in the "park" position, a second circuit path is completed through the engine oil pressure switch 22 and the transmission park switch 20 to supply a signal from the battery to the vehicle speed switch 18. If vehicle's speed is below a/predetermined level, for example 5 m.p.h., the vehicle speed switch 18 closes and a signal is supplied to the input of the second time delay relay 16.ion of the second time delay relay 16 causes a signal to be applied for a predetermined time (30 sec.) to the air supply control input 52 of the latching solenoid 12. As a result, the latching solenoid 12 is latched to a position in which the control port 54 is coupled to the air supply port 58, thereby supplying air to the pilot control port 60 of the parking control valve 10 and causing. the parking control valve 10 to trip to an exhaust position thereby applying the spring applied parking brake.

In order to allow for servicing, the override switch 24 is preferably provided to bypass the engine oil pressure switch 22 and the transmission park switch 20 and supply a signal from the ignition circuit directly to the first time delay relay 14. The first time delay relay 14 then closes and supplies a signal to the exhaust control input 48 of the latching solenoid 12 to enable the release of the parking brake by pushing the parking brake control knob 62.

The invention has been described with reference to certain preferred embodiments thereof. It will be understood, however, that modifications and variations are possible within the scope of the appended claims. For example, although it is preferably to utilize a vehicle speed switch as an added precaution, the use of the vehicle speed switch can be eliminated while still providing the function of application of the parking brake with the engine is off and the transmission is in park. Further, the invention can be implemented using relay control logic, solid state logic devices, special purpose processors, general purpose processors programmed to perform the specific functions described, magnetic or non-magnetic latching solenoids, or any other circuit elements or components that perform the function of applying the parking brake when the engine is turned off and the transmission is in the "park" position, while not requiring the constant application of electrical power. Still further, indicators other than oil pressure may be utilized to determine the operating state of the engine including, but not limited to, engine revolutions, ignition circuit status, intake manifold pressure, exhaust manifold pressure and alternator output.

What is claimed is:

1. A parking brake control circuit for a vehicle comprising:

an engine oil pressure switch including a first circuit input and a second circuit input;

a transmission park switch including a first circuit input coupled to a first circuit output of the engine oil pressure switch and a second circuit input coupled to a second circuit output of the engine oil pressure switch;

a first time delay device having an input coupled to a second circuit output of the transmission park switch;

a second time delay device having an input coupled to a first circuit output of the transmission park switch; and a latching solenoid including a supply control input coupled to an output of the first time delay device and an exhaust control input coupled to an output of the second time delay device.

2. A parking control circuit as claimed in claim 1, wherein the first circuit input of the engine oil pressure switch is coupled to an ignition circuit of the vehicle and the second circuit input of the engine oil pressure switch is coupled to a storage battery of the vehicle.

3. A parking control circuit as claimed in claim 2, further comprising a parking control valve including a pilot control input, an air supply input and an air supply output.

4. A parking control circuit as claimed in claim 3, wherein the air supply input of the parking control valve is coupled to an air supply of the vehicle and the air supply output of the parking control valve is coupled to a brake of the vehicle.

5. A parking control circuit as claimed in claim 4, wherein the pilot control input of the parking control valve is coupled to a control port of the latching solenoid.

6. A parking control circuit as claimed in claim 5, wherein the latching solenoid couples the control port to the air supply of the vehicle when a signal is supplied to the supply control input and couples the control port to an exhaust port when a signal is supplied to the exhaust control input.

7. A parking control circuit as claimed in claim 2, further comprising an override switch having an input coupled to the ignition circuit of the vehicle and an output coupled to the input of the second time delay device.

8. A parking control circuit as claimed in claim 1, further comprising a vehicle speed switch having an input coupled to the second circuit output of the transmission park switch and an output coupled to the input of the first time delay device.

9. A parking control circuit as claimed in claim 1, wherein the vehicle speed switch closes when the speed of the vehicle is below five m.p.h.

10. A parking control circuit as claimed in claim 1, wherein the first and second time delay device comprise time delay relays that provide a time delay of thirty seconds.

11. A parking control circuit as claimed in claim 1, wherein the latching solenoid comprises a magnetic latching solenoid.

* * * * *